S. Thomson.
Broadcast Seeding-Mach.
N° 74171  Patented Feb. 4, 1868.
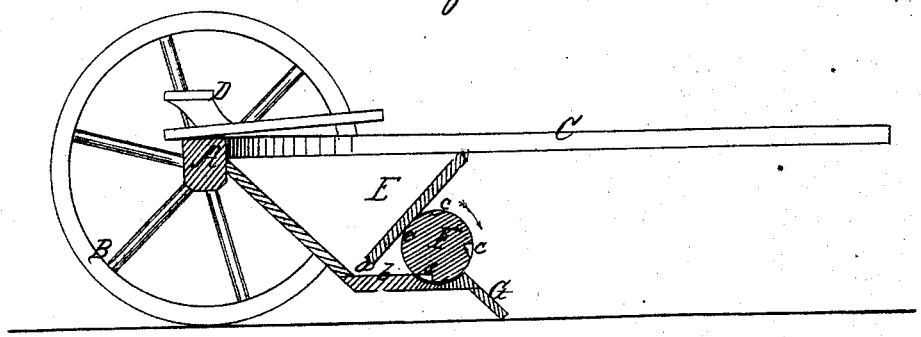
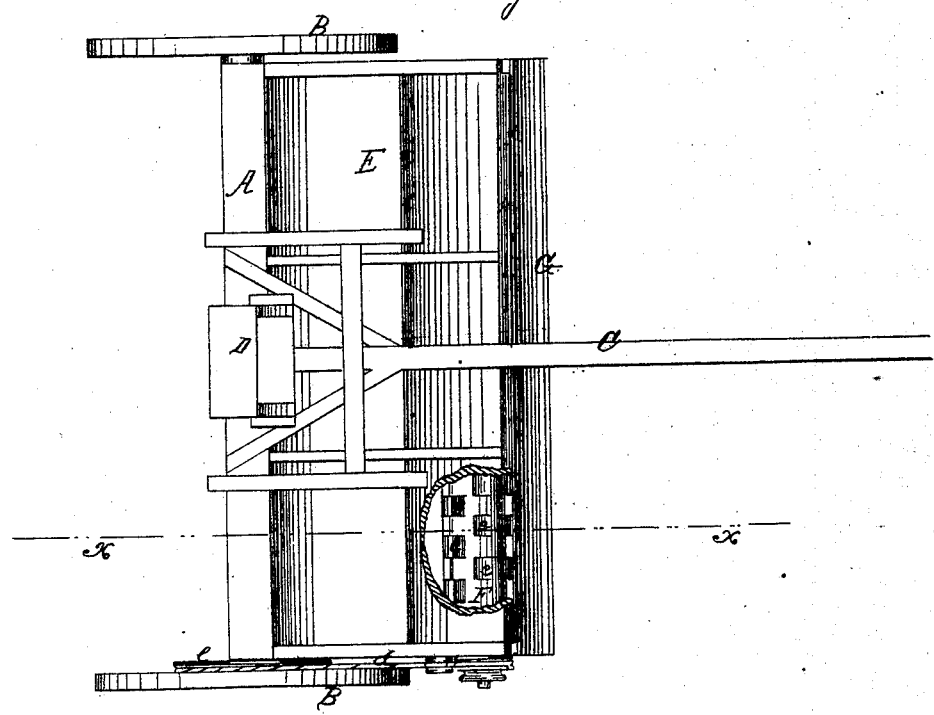
Witnesses
Theo Tusche
J. A. Servius
Inventor
Samuel Thomson
Per Warner
Attorneys

United States Patent Office.

SAMUEL THOMSON, OF OSCEOLA, WISCONSIN.

*Letters Patent No. 74,171, dated February 4, 1868.*

IMPROVEMENT IN BROADCAST SEEDING-MACHINE.

*The Schedule referred to in these Letters Patent and making part of the same.*

TO ALL WHOM IT MAY CONCERN:

Be it known that I, SAMUEL THOMSON, of Osceola, in the county of Polk, and State of Wisconsin, have invented a new and improved Broadcast Seeding-Machine; and I do hereby declare that the following is a full, clear, and exact description thereof, which will enable those skilled in the art to make and use the same, reference being had to the accompanying drawings, forming part of this specification.

This invention relates to a new and improved seeding-machine, of that class which are designed to sow seed in a broadcast manner, and in greater or less quantity over a given area, as may be required.

The invention consists of a seed-box or hopper, applied to an axle provided with ordinary wheels, and having a revolving cylinder placed in front, containing seed-cells, said cylinder being arranged in such relation with the discharge-aperture, at the bottom of the hopper, that the seed, as the implement is drawn along and the cylinder rotated, will be taken up by the cylinder, and discharged upon a scattering-band, from which it is discharged upon the ground in a broadcast manner. In the accompanying drawings—

Figure 1 is a side sectional view of my invention taken in the line $x\ x$, fig. 2.

Figure 2, a plan or top view of the same.

Similar letters of reference indicate corresponding parts.

A represents an axle, having a wheel, B, on each end of it, and a draught-pole, C, attached. D is the driver's seat, placed centrally on the axle at the rear of the draught-pole. E is a seed-box or hopper, which is secured to the front side of the axle, extending the whole length of the same. This seed-box or hopper is of V-form in its transverse section, and an opening, $a$, is allowed at its lower end, through which the seed passes upon a horizontal bottom plate, $b$, as will be fully understood by referring to fig. 1. F is a cylinder, which is placed and works in the angle formed by the bottom plate $b$, and the front side of the seed-box, as shown clearly in fig. 1. This cylinder may be constructed of wood or metal, and it has recesses or seed-cells $c$ placed in its periphery. If the cylinder be of wood, these recesses or cells should be wholly or partially lined with metal, in order to prevent wear or splitting. The cylinder, F, as the implement is drawn along, is rotated in the direction of the arrow, 1, by a belt, $d$, from a pulley, $e$, attached concentrically to one of the wheels, B, and the speed of rotation may be increased, when desired, by slipping one or more rings over the pulley, $e$, which of course enlarges said pulley.

It will be seen, from the above description, that as the implement is drawn along, the seed which passes through the opening $a$, at the lower part of the seed-box, will be taken up by the cells in the cylinder F, and discharged from said cells as the latter pass over in front of the axis of the cylinder. The seed, as it is discharged from the cylinder, falls upon an inclined board, G, which serves as a scatterer, and causes the seed to be discharged upon the ground in a broadcast manner.

By varying the diameter of the pulley $e$ to regulate the speed of rotation of the cylinder, F, a greater or less quantity of seed may be sown over a given area, as desired.

The device may be attached to the rear of any ordinary wagon or vehicle, or a team may be hitched directly to it.

I claim as new, and desire to secure by Letters Patent—

The rotating seed-discharging cylinder F, in combination with the seed-box or hopper E, having an opening, $a$, at its lower part, the bottom plate $b$, and the scattering-board G, all arranged to operate substantially as and for the purpose herein set forth.

SAMUEL THOMSON.

Witnesses:
S. T. CATLIN,
H. C. GOODWIN.